United States Patent [19]
Boardman et al.

[11] Patent Number: 5,656,052
[45] Date of Patent: Aug. 12, 1997

[54] APPARATUS FOR AND METHOD OF HEATING AND BENDING GLASS SHEET

[75] Inventors: James Boardman, Birmingham; Ian Nichols Tetlow, Coventry, both of United Kingdom

[73] Assignee: Pilkington Glass Limited, Merseyside, United Kingdom

[21] Appl. No.: 360,083

[22] Filed: Dec. 20, 1994

[30] Foreign Application Priority Data

Dec. 23, 1993 [GB] United Kingdom ............ 9326288

[51] Int. Cl.⁶ .......................... C03B 21/00; C03B 23/00
[52] U.S. Cl. ................... 65/103; 65/104; 65/107; 65/117; 65/268; 65/273; 65/285; 65/288
[58] Field of Search .................. 65/103, 104, 106, 65/107, 117, 268, 273, 285, 287, 280

[56] References Cited

U.S. PATENT DOCUMENTS

| | | | |
|---|---|---|---|
| 3,249,415 | 5/1966 | McMaster et al. | 65/160 |
| 3,457,060 | 7/1969 | Leflet et al. | 65/288 |
| 4,111,676 | 9/1978 | Mechling et al. | 65/114 |
| 4,687,501 | 8/1987 | Resse | 65/103 |
| 4,966,547 | 10/1990 | Okuyama et al. | 432/9 |
| 5,085,580 | 2/1992 | Reunamaki | 432/59 |
| 5,173,102 | 12/1992 | Weber et al. | 65/273 |

FOREIGN PATENT DOCUMENTS

| | | | |
|---|---|---|---|
| 0376509A1 | 7/1907 | European Pat. Off. | C03B 29/08 |
| 338216 | 10/1989 | European Pat. Off. | |
| 0486952A2 | 5/1992 | European Pat. Off. | C03B 29/08 |
| 504117 | 9/1992 | European Pat. Off. | |
| 0592862A1 | 4/1994 | European Pat. Off. | C03B 29/08 |
| 784382 | 10/1957 | United Kingdom | |
| 836560 | 6/1960 | United Kingdom | |
| 890269 | 2/1962 | United Kingdom | |
| 2201670 | 9/1988 | United Kingdom | |

*Primary Examiner*—David A. Redding
*Attorney, Agent, or Firm*—Burns, Doane, Swecker & Mathis, L.L.P.

[57] ABSTRACT

A furnace is provided for the heating of glass sheets to be bent, whereby precise control of the temperature profile across a sheet may be achieved, resulting in improved control over the shape to which the sheet is bent. The furnace has at least one differential heating zone provided with a plurality of main heating elements, and at least one shield for directing heat radiated by said heating elements whereby a controlled differential heating of the glass sheet may be achieved. Transport means, e.g. wheeled boxes, are provided to advance the sheet through the furnace and bending means, e.g. gravity bending ring moulds, may bend the sheet either during, or subsequent to, the heating step.

18 Claims, 10 Drawing Sheets

APPARATUS FOR AND METHOD OF HEATING AND BENDING GLASS SHEET

BACKGROUND OF THE INVENTION

1. Field of the Invention

The present invention relates to a glass bending furnace, i.e. a furnace for heating glass sheets to be bent, for the bending of glass sheets to complex shapes, wherein precise control of the temperature profile across each glass sheet is required. The invention also relates to a method of bending glass sheets employing such a furnace.

The shape to which a glass sheet is formed in any bending process is greatly influenced by the temperature of the sheet, for the viscosity of the glass changes rapidly with temperature. Moreover, temperature differences within the glass sheet will similarly have a significant effect. It is therefore highly desirable to precisely control the temperature profile across the sheet in order to successfully produce particular shapes, and also to ensure reproducibility in mass production.

2. Description of the Related Art

It is known from EP 504 117 to control the temperature profile across a glass sheet in combination with a quenching step, so as to differentially toughen the sheet.

A simple method of affecting the temperature profile in a glass sheet to be bent is to place shields over those parts of the glass sheet which are to be heated to a lesser degree, thereby shading those parts, i.e. blocking the heat from reaching them. In service, these shields become hot and themselves become secondary radiators of heat, reducing their effectiveness. U.S. Pat. No. 4,687,501 in the name of PPG Industries Inc seeks to alleviate this problem in the context of gravity bending by provision of secondary shields to shade the glass from the hot primary shields. This is inevitably somewhat cumbersome, and such shields would obstruct the automatic glass handling equipment commonly used in modem factories to transfer the glass sheets from one stage of the process to the next.

Such shields are normally attached to a mould or other support which carries the glass sheet, so that the shields travel with the glass sheet through the furnace, or even the whole bending system. However, a typical glass bending system of the kind in which the glass is heated in position on a mould contains many moulds, each of which has to be equipped with the shields, so a large number of shields is required in total, and any adjustment of the shields required on one mould may similarly be required on every other mould. Since these shields can only be adjusted when a mould is outside the furnace, the shading pattern created cannot change during the passage of a glass sheet through the various heating sections in the furnace. This inflexibility is now seen as a shortcoming, for in the production of the technically increasingly difficult glass shapes demanded by present-day vehicle designers, it is desirable to be able to tailor the heating profile in different heating sections for different purposes. For instance, one may wish to provide extra heating at the corners of the glass sheet, but only when the sheet as a whole has reached the bending temperature. By their very nature, shields of this type are only suitable for reducing the degree of heat the glass sheet receives, and then only in a relatively small area. No attempt is made to direct the heat blocked by these shields to a portion of the sheet in which increased heating is desired.

Furthermore, as normally the shields also remain in position during the passage of the glass through the annealing sections of the bending system, the shields affect the cooling of the glass. This can give rise to undesirable stress patterns in the glass and problems of optical distortion.

It is also known to use heat sinks, i.e. bodies placed near the glass which absorb heat from it, to control the temperature profile in a glass sheet. However, the effectiveness of heat sinks also reduces as they reach the ambient temperature, and as they are also normally attached to the mould or other glass support, their use is accompanied by most of the other disadvantages of shields as well.

GB 2,201,670A proposes the reverse technique to using a heat sink, namely, using a body of thermally insulating material as a heat reflector; a laboratory experiment is described in which such a body is placed beneath a portion of a glass sheet which it is desired to preferentially heat. In a production furnace, such reflectors would also have to be mounted on the moulds (or at least in boxes, or on trolleys, that carried the moulds) and so would be subject to the same problems as described for shields and heat sinks above.

Where an increased heat input is required in a localised area it has long been known to apply extra heat in that particular area by means of auxiliary heaters, known to those skilled in the art as "crease heaters". UK 836,560 is one of many specifications which describe such heaters; in this embodiment the heaters are suspended through slots in the roof of the furnace, but other forms of support are possible. If it is necessary to limit the area of a glass sheet heated by the crease heater, adjacent parts of the glass sheet may be shaded from it as is shown in FIG. 10 of EP 338 216 A2.

Although such crease heaters serve a useful purpose, they also have many disadvantages, such as obstructing the space in the furnace above the glass sheets, and being prone to damage or misalignment. They cannot be used over the centre of the sheet, where a long support arm would be needed which would itself shield the glass. Because of the need for support, crease heaters cannot be made large enough to cover substantial areas. Attempts to alleviate some of the problems, e.g. automating the adjustment and insertion/removal of crease heaters with servo motors, entails great expense and the risk of unreliability. Furthermore they are not suitable for creating non-local temperature differentials, such as a centre-edge differential controlled over the entire centre-edge distance in the glass sheet.

One way of controlling the temperature profile across the whole glass sheet is to arrange separate regulation of separate areas of heaters, or indeed of separate heating elements, in the glass bending furnace. For example, EP 443 948 A1 discloses a furnace which includes sets of electrical resistances in its upper part, with the temperature or power of the sets independently regulated. The orientation and location of such sets of resistances are also arranged to optimise control of the temperature profile in a glass sheet. In such a furnace, it is possible to control the temperature profile across the whole glass sheet. The object may be to obtain as uniform a temperature as possible in the sheet, or to create a particular centre-edge temperature differential, according to the requirements of the particular shape to be formed.

However, there are limitations on the magnitude of temperature differentials thus produced. If a particular set of elements is run at high power to preferentially heat the part of the glass sheet directly below that set, adjacent parts of the sheet will inevitably also receive extra heat. This may be controlled to a certain extent by reducing the distance from the elements to the glass sheet. While reduction of this distance will reduce unwanted heating of adjacent parts of the glass sheet, it can result in optical distortion of the glass sheet if this distance becomes too small. Hence there remains a need for a further technique.

In EP 443 948 A1, further control of the temperature profile is obtained by providing additional heating elements in the walls of the furnace. For example, the last paragraph of the description describes the manufacture of an S-shaped glazing, and the need for a marked temperature difference between certain parts of the glass sheet. The last sentence of this paragraph explains that it is advantageous to heat the upwardly convex part of the S-shaped glazing by the wall heaters to avoid overheating the central part of the sheet, but of course, the provision of extra heaters in the walls of the furnace entails extra expense; it would be desirable to obtain the further temperature control required for certain products using heating elements in the roof only.

It is easier to control the bending of glass in a so-called "simple" bend, i.e. when the axes of curvature are parallel or only at small angles to each other, and this has usually been the case in the past. However, glass of complex shape, that is, glass having curvature in two substantially perpendicular directions, is increasingly being required, e.g. for automotive applications, and this presents more difficulties.

When such glass is produced by means of the gravity or "sag" bending process, difficulty has for example been experienced in obtaining the desired cross curvature profile. By cross curvature profile is meant change in curvature in a direction extending from the top to the bottom of the window, e.g. a windscreen, as seen in its installed condition. Such curvature is about one or more substantially horizontal axes extending from one side of the vehicle to the other. Often a uniformly circular cross curvature profile is desired, but in practice a flatter region is obtained in the central region of the windscreen with most curvature near the top and bottom. This can result in the perception of an unacceptable secondary image by the driver. In cases where an increased degree of complex curvature is required, and/or the height of the windscreen increases relative to its width, an inverse cross curvature may occur in the centre of the windscreen, so that a cross-section on the axis of symmetry would begin to resemble an inverted letter "w". In addition to optical problems, this results in poor wiper performance.

SUMMARY OF THE INVENTION

To bend such shapes satisfactorily it is important to attain higher temperatures in the central region of the glass sheet, with higher temperature differentials between the centre and a long edge of the glass sheet than has hitherto been possible. A need therefore exists for a way of attaining such higher centre-edge differentials.

Moreover, for the production of a glass pane having an asymmetric cross curvature profile, e.g. an S-shape, an asymmetric temperature profile is required across the glass sheet. Such asymmetry may take the form of a displaced maximum temperature, i.e. one located elsewhere than over the centre of the glass sheet. Alternatively or additionally the asymmetry may be as a result of different temperature gradients from the point of maximum temperature to the two long edges.

In other bending processes, e.g. those which employ two moulds or dies to shape the glass sheet, it is also desirable to be able to control the temperature profile imparted to a glass sheet in the heating stages more precisely, and by less cumbersome and more controllable means than has hitherto been the case; it may further be desirable to attain higher temperature differentials between parts of the glass sheet than previously possible.

It has now been found that excellent control of temperature profile and surprisingly high temperature differentials can be attained more precisely and reproducibly in a glass sheet in a glass bending furnace by use of means for directing heat radiated by the furnace heating elements.

According to the present invention there is provided a glass bending furnace comprising:

a plurality of radiant main heating elements for heating a glass sheet to its bending temperature, at least one shield for directing radiant heat, the shield being disposed within the furnace on the same side of a position to be occupied by the sheet as the main elements, and transport means for advancing the sheet through the furnace, characterised in that the furnace includes at least one differential heating zone in which the main elements and the shield are provided, and a radiant mean heating element constitutes the heating element positioned closest to the shield.

By main heating elements are meant the heating elements installed in the roof, walls or floor of the furnace, which together constitute the principle source of heat; auxiliary heaters such as crease heaters are not included. Whereas crease heaters are generally adjustable in all directions, main furnace elements are generally adjustable in at most a direction substantially perpendicular to the surface on or from which they are mounted, i.e. the roof, walls or floor. Main elements may be said to be permanently installed (subject to maintenance requirements) whereas the installation of auxiliary heaters is of a temporary nature, so that they can be easily removed from the furnace. The main elements are preferably electric, but could be gas elements.

The shield provided by the present invention is associated with the furnace, and not with a mould on which a glass sheet is bent, or a means of transport therefor, so that, when the mould supporting the glass sheet is advanced through the furnace in the course of production, the mould moves past the shield which remains stationary. The shield will usually be mounted or supported from or through the furnace roof, walls or floor; at least part of the shield is positioned between the main heating elements and the glass sheet to be bent.

This part of the shield may be regarded as the operative portion, because radiant heat is directed by this portion of the shield to a selected portion of the glass sheet, whereas the part of the shield between the main elements and the adjacent furnace structure (e.g. roof, walls or floor) acts as a support for the operative portion.

Since a shield according to the invention is intended to direct heat from the main elements and not heat from crease heaters, the shield preferably extends closer to the main heating elements than it does to the glass sheet. In a furnace where these elements are in the roof or floor and the distance from the elements to the curved glass sheet (as bent to the final shape desired) at a shield location is 330 mm, the operative portion of the shield preferably extends from a level 0 mm to 100 mm from the level of the elements to a level 300 mm to 50 mm from the glass sheet (equivalent to 30 mm to 280 mm from the level of the elements), and, the operative portion of the shield is at least 30 mm long. More preferably, the operative portion extends from a level 0 mm to 50 mm from the level of the elements to a level 300 mm to 180 mm from the glass sheet.

In a furnace of different size, the distances should be scaled accordingly. For instance, the distance from the main heating elements to the curved glass sheet at a shield location may be designated 'x' (note that this distance varies across the sheet because of its curvature). The operative portion of the shield preferably extends from a level 0% to 30%, more preferably 0% to 15%, of x from the level of the elements to a level 9% to 85%, more preferably 9% to 45%, of x from the elements (equivalent to 91% to 15%, more preferably 91% to 55% of x from the glass sheet), and, the operative portion has a length equal to at least 9% of x.

In a preferred aspect of the invention, a shield is mounted substantially vertically between a pair of heating elements in the roof of the furnace, and extends downwardly beyond the heating elements. It is convenient to provide means of adjusting from outside the furnace the extent to which the shield extends downwardly beyond the heating elements, thereby allowing on-the-run adjustment of the heating conditions.

Shields are preferably mounted substantially vertically, and in a furnace where a glass bending mould is advanced through the furnace, the shields will usually (but not necessarily) be either generally perpendicular to the direction of advancement of a mould, or generally parallel to it (although some shields may be perpendicular while others are parallel).

As will become clear from the following description, shields in accordance with the invention have many advantages over the prior art. However, that does not preclude the use of prior art shields, heat sinks, or crease heaters in conjunction with a furnace equipped according to the invention. Such prior art devices may still be advantageously employed, especially where a localised alteration of heating conditions is desired.

A bending furnace according to the invention may employ any of the known glass bending processes, (e.g. gravity (sag) bending, press bending or others), for shields can be used to advantage wherever glass is heated, regardless of the type of bending process employed. The invention is especially useful where the actual bending of the glass takes place in a radiatively heated part of the furnace because in such furnaces the thermal profile in the glass sheet may be controlled while bending is in progress, i.e. adjustments made at different stages of the bend, and so an especially close control on the resulting glass shape may be achieved. The degree of bend achieved at any stage may be assessed by direct observation, or by a remote system. The bending furnace may be one in which the gravity bending process is used, with or without an auxiliary press bending step, and bending may occur either during, or subsequent to, heating of the sheet.

The transport means is arranged to co-operate with the bending means in achieving satisfactory bending of the sheet when heated to its bending temperature. For example, when the bending means is a gravity bending ring mould, the mould is transported through the furnace by the transport means. Alternatively or additionally, when the bending means is a press bending station, the transport means supplies a heated sheet to the station so that it may be press bent, and optionally removes the sheet from the station after bending.

The invention is applicable to a wide variety of furnace types, for example, it may be applied in a roller hearth furnace in which the glass is heated while supported on rollers before being bent (usually on curved rollers and/or on a bending mould), or in a gas hearth furnace in which the glass is heated, and optionally bent, while supported on a cushion of gas. However, it is especially applicable to furnaces, for example indexing furnaces, in which the glass is placed on a bending mould, usually a segmented mould with relatively movable parts or segments, and the mould bearing the glass is advanced through successive heating, heating with bending and annealing sections. Transport of the mould may be in a box, or on a carriage or trolley.

Thus a preferred glass bending furnace according to the invention comprises successive heating, heating with bending, and annealing sections, wherein at least one of the heating and heating with bending sections comprises at least one differential heating zone, and transport means for advancing a mould through said sections, wherein said differential heating zone is provided with a plurality of main heating elements and a shield, associated with the furnace, for directing heat radiated by said heating elements whereby a controlled differential heating of the glass may be achieved. Such furnaces are commonly used for bending sheets of glass in pairs for use in the production of laminated vehicle windows, especially automotive windsreens. A heating with bending section is one in which a glass sheet is bent while being heated.

According to a further aspect of the invention, there is provided a method of bending a glass sheet comprising:
  advancing the sheet through a furnace provided with a plurality of radiant main heating elements, while
  heating the sheet to its bending temperature in the furnace, including
  heating the sheet differentially, including
    directing radiant heat from one selected portion of the sheet to be heated less, towards another selected portion of the sheet to be heated more, so as to establish a desired temperature differential between such portions, and directing the heat by means of at least one shield, the shield being disposed within the furnace on the same side of the sheet as the main elements,
  bending the sheet to a predetermined shape, and
  cooling the bent glass sheet characterised in that
    the furnace includes at least one differential heating zone in which the main elements and the shield are provided,
    and a radiant main heating element constitutes the heating element positioned closest to the shield.

In a preferred method according to the invention, a first part of the radiant heat radiated by the main elements towards the glass sheet impinges directly on the sheet, i.e. there is no intervening surface present, and a second part of the radiant heat is directed by the shield. The second part of the radiant heat would otherwise have reached the portion(s) of the sheet selected to be heated to a lesser extent. The directing of heat by the shield therefore has a concentrating effect on the heat directed to the portion(s) of the sheet selected to be heated to a greater extent, and increases heat transfer to this portion or portions.

According to a still further aspect of the present invention, there is provided a glass sheet bent in a furnace, or by a method, in accordance with the invention.

BRIEF DESCRIPTION OF THE DRAWINGS

The invention is illustrated but not limited by the following description of a number of preferred embodiments with reference to the accompanying drawings in which.

DETAILED DESCRIPTION OF THE PREFERRED EMBODIMENTS

Figure 1:
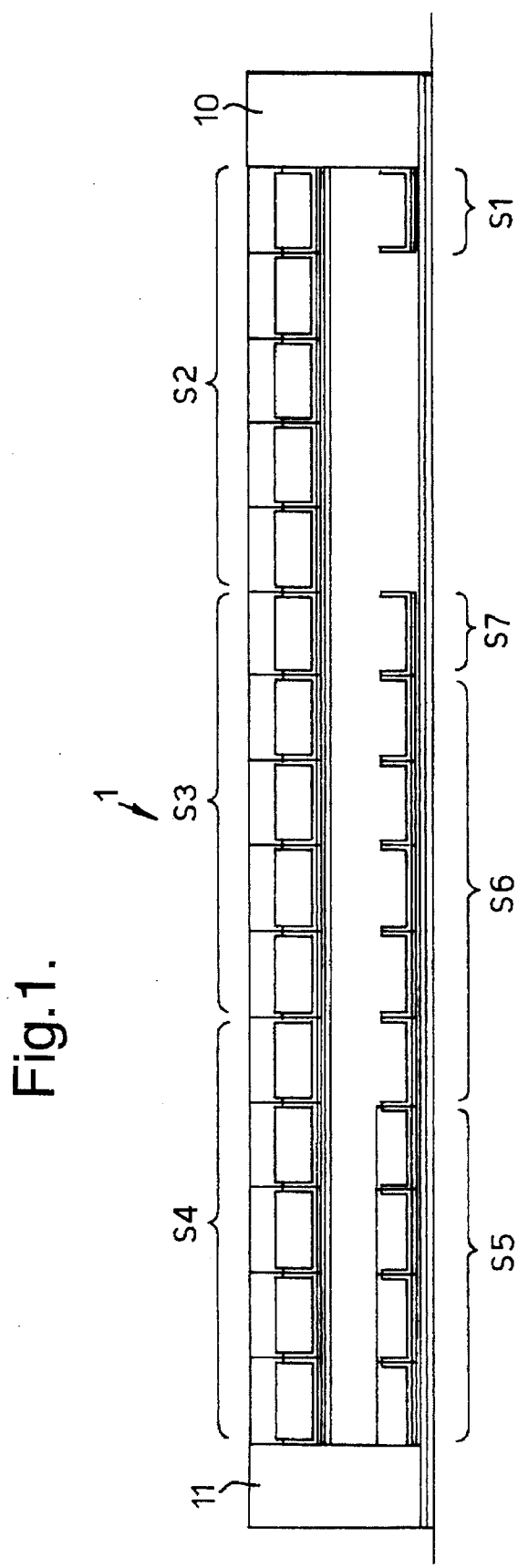
FIG. 1 is a schematic elevation of a glass bending furnace incorporating a number of heated zones, some of which are used for bending.

In the glass bending furnace 1 of FIG. 1, glass sheets are loaded on to gravity bending ring moulds, heated, bent under the influence of gravity (with or without an additional pressing step) so as to generally conform to the shape of the ring mould with a required degree of FIG. 1, curvature, annealed, further cooled and unloaded. In FIG. 1, S1 denotes a loading section, S2 a uniform heating section, S3 a differential radiative heating section, S4 a heating with bending section with differential radiative heating, S5 an annealing section, S6 a cooling section and S7 an unloading section.

Each section consists of as many zones as are necessary to give the required throughput and cycle time, given that each zone may hold one ring mould and the glass sheet(s) on each mould should remain in each section for a predetermined length of time. In this type of furnace, the glass sheets do not move continuously, but in a series of steps, so that the mould supporting the glass sheet(s) remains stationary, accurately located in a zone, for the predetermined length of time before being moved to the next zone.

Such a furnace is referred to as an indexing furnace, and the mould (and the sheet supported on the mould) is said to be indexed with each successive zone as it advances. In normal operation, movement of the moulds in such a furnace is in one direction only, i.e. anticlockwise in the direction in which one views FIG. 1.

The uniform heating of section S2 may be either convective or radiative in nature; the objective is simply that the heating power is substantially uniform from one side of each zone to the other.

Figure 6:
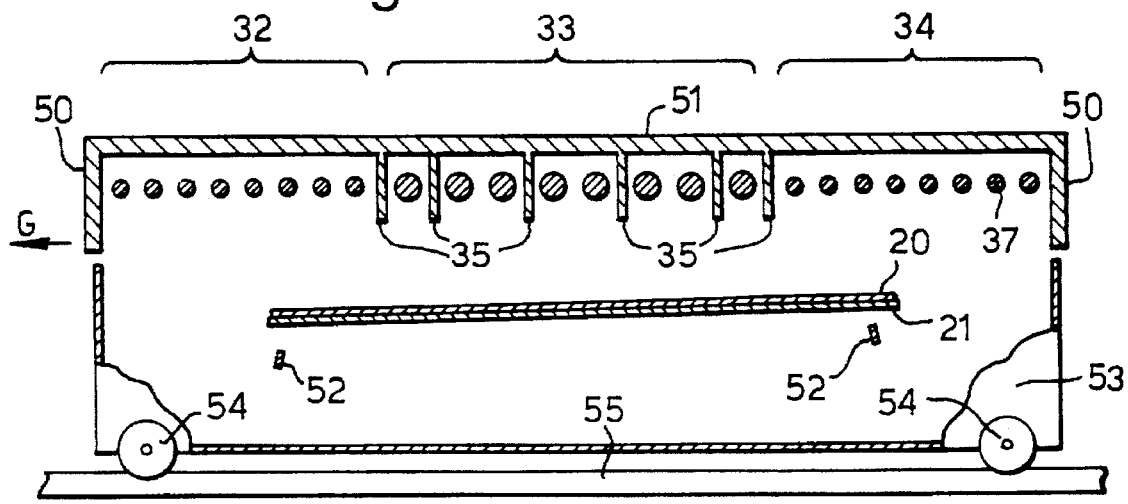
FIG. 6 is a similarly enlarged cross-section taken in the direction of arrows VI—VI of FIG. 3.

The ring moulds are advanced through the furnace by transport means which are further described in conjunction with FIG. 6. At each extremity of the furnace, a mechanism 10, 11 is provided for transferring the moulds together with the transport means between upper and lower levels.

Figure 12:
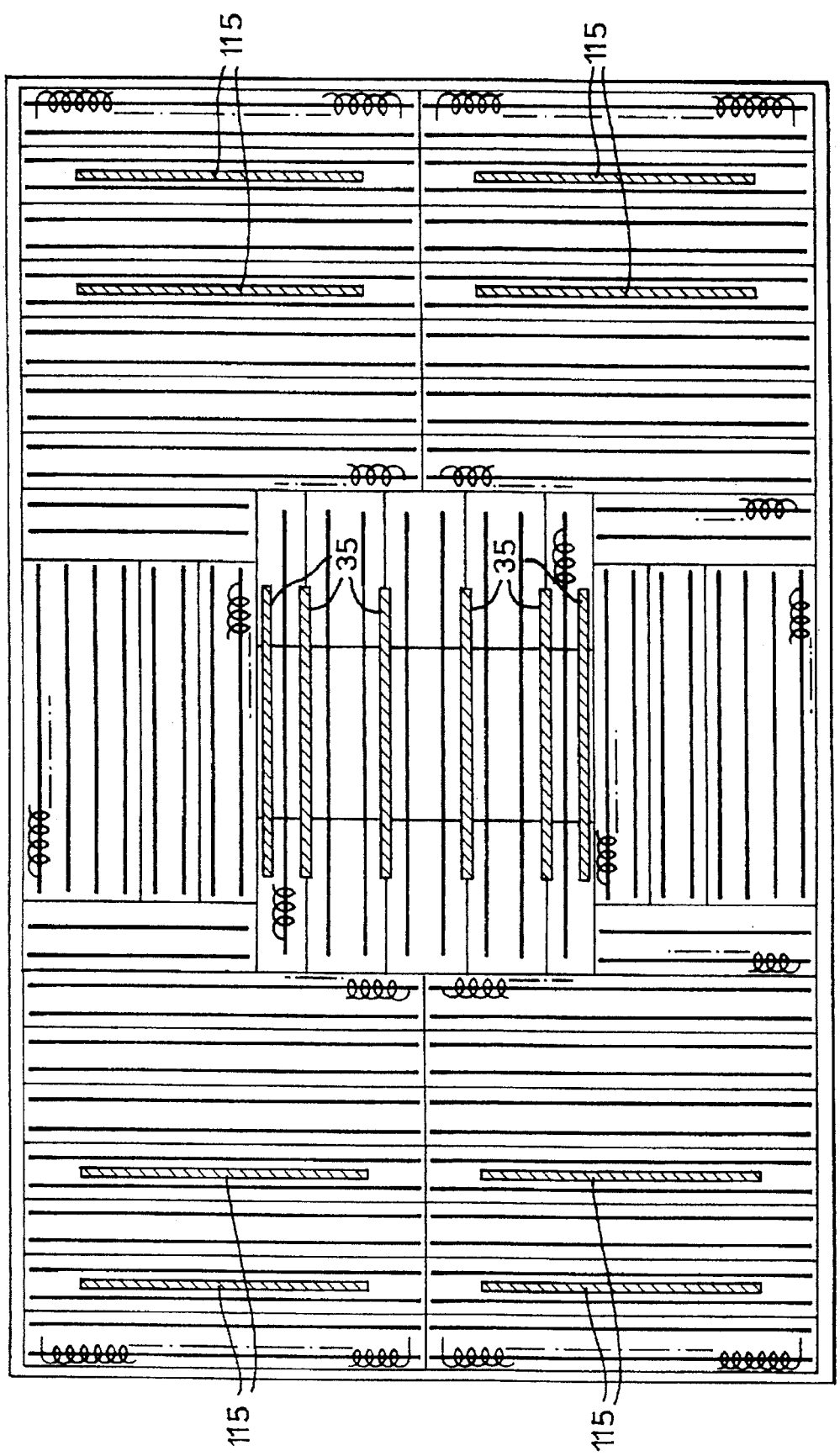
FIG. 12 is a plan view similar to FIG. 3, but showing additional shields.
Figure 13:
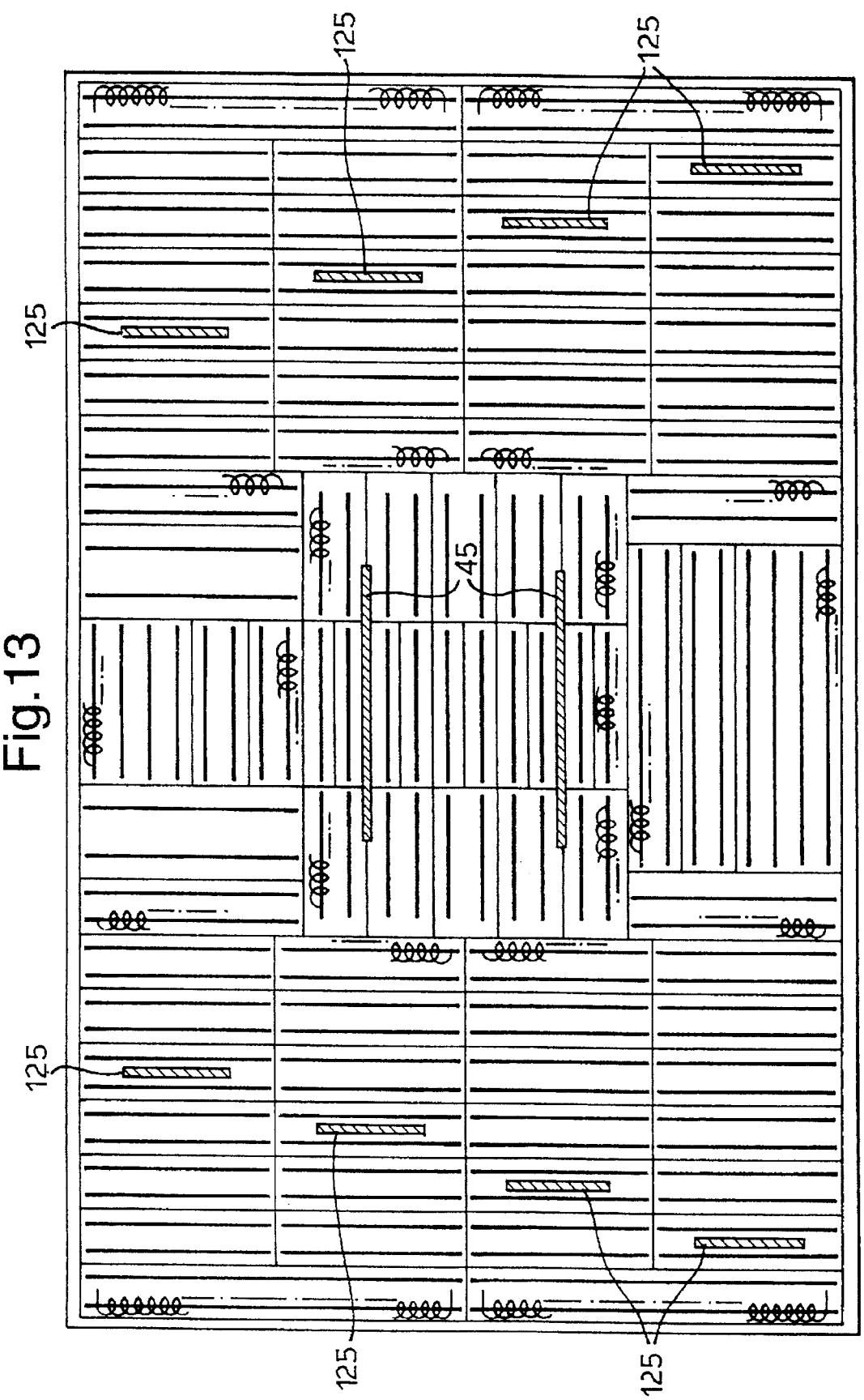
FIG. 13 is a plan view similar to FIG. 5, but showing additional shields.

Shields may be employed to advantage in sections S3 or S4, and preferred arrangements are shown in FIGS. 3 to 9, and also in FIGS. 12 and 13.

Figure 2:
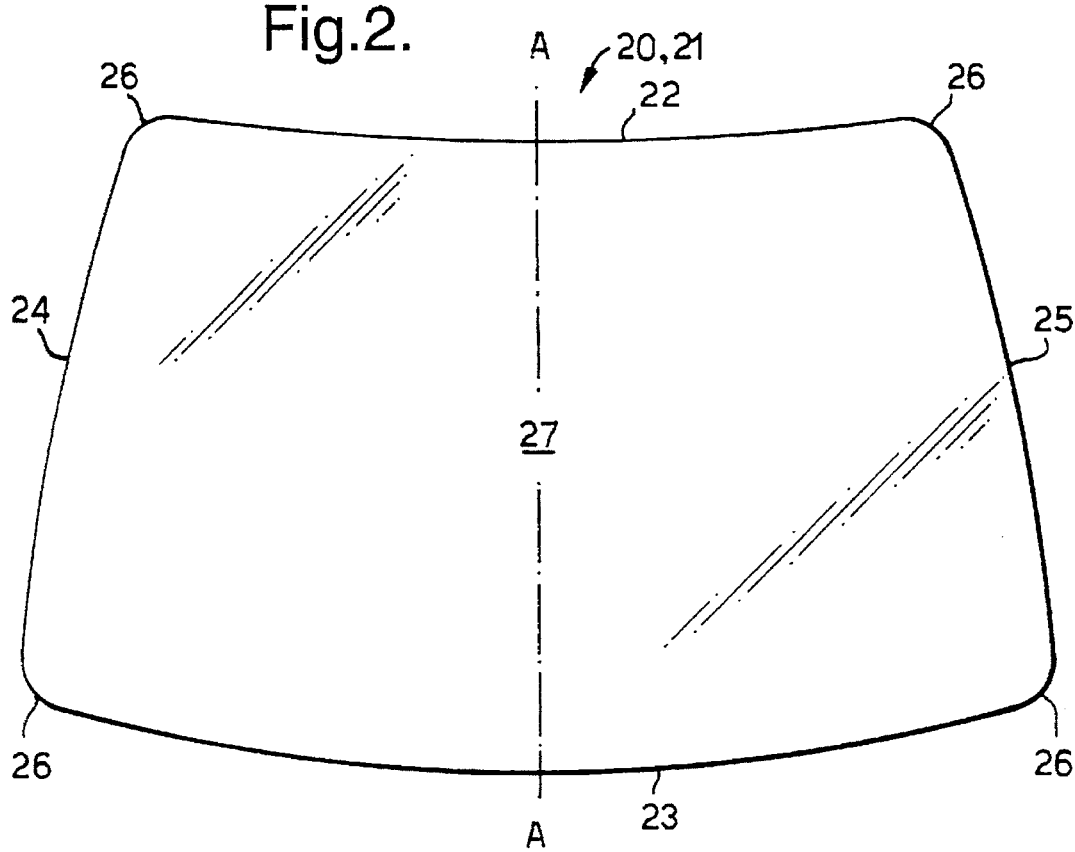
FIG. 2 is a plan view of a glass sheet which may be bent in the furnace of FIG. 1.

FIG. 2 shows a glass sheet which may be bent in furnace 1. In fact, the preferred embodiment of furnace in accordance with the invention is used for bending glass sheets in pairs, one on top of the other, to produce a matched nesting pair for laminating, e.g. into a windscreen. The sheets 20,21 are identical except that the upper sheet of the pair is normally slightly smaller to improve the match after bending. Sheets 20,21 have long edges 22,23; short edges 24,25; corners 26, and a central portion 27. The sheets possess an axis of mirror symmetry A—A. Cross-curvature is the curvature in a direction from upper long edge 22 ("upper" in the orientation of a windscreen when installed in a car) to lower long edge 23, e.g. along axis A—A. Of course, the invention is not limited to bending sheets of the shape illustrated, sheets of any shape may be bent in accordance with the invention.

Figure 3:
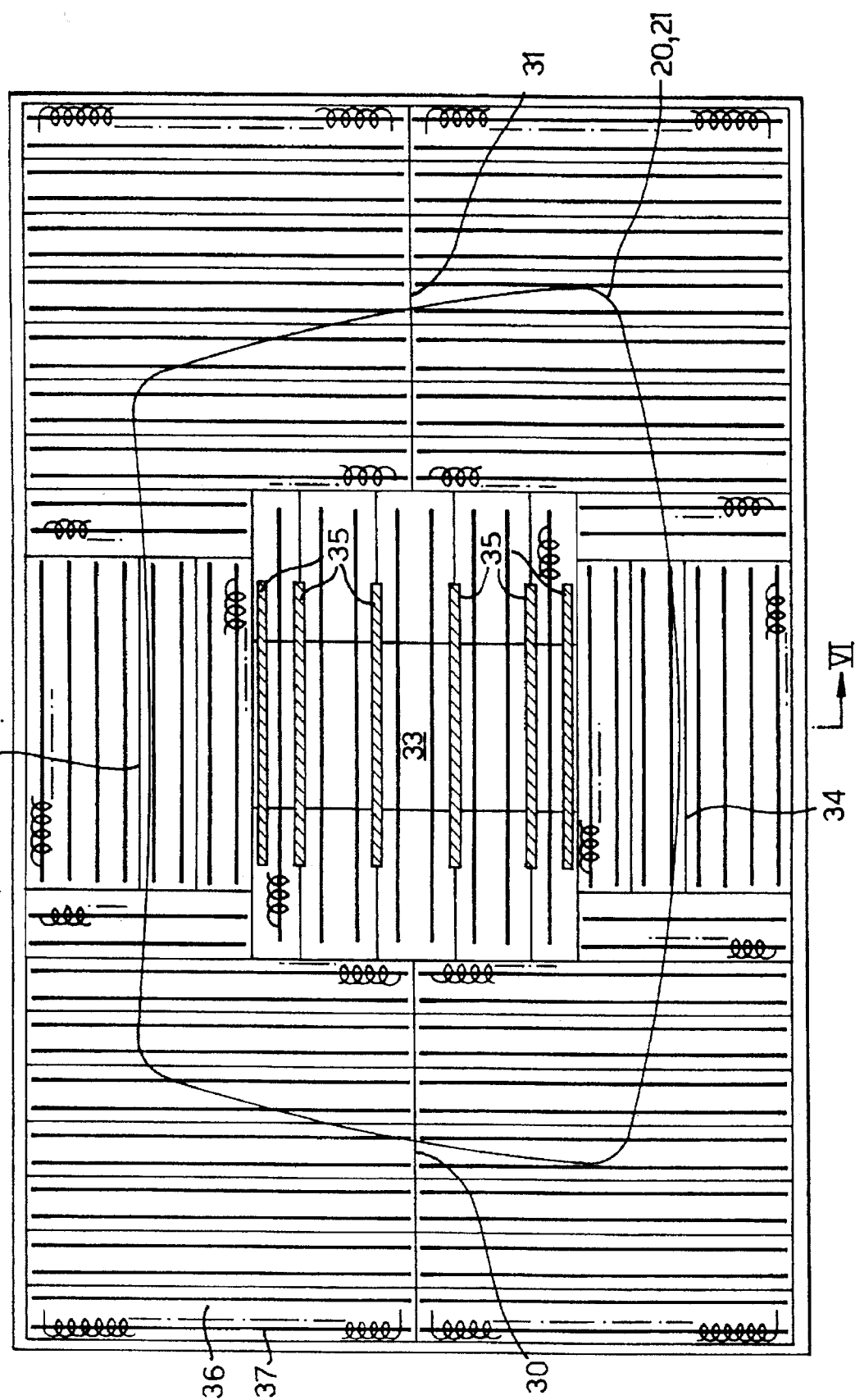
FIG. 3 is a greatly enlarged schematic plan view of a heating arrangement of one zone of FIG. 1, including six shields in accordance with the invention.

In FIG. 3, the heating arrangement in a zone from the differential radiative heating section S3 is illustrated in detail. The roof of the zone is equipped with elongated electrical heating elements in various heating regions 30–34 according to length and orientation of the elements and amongst the elements are a number of shields 35. Each region is made up of blocks, of which one is designated 36, and each block contains 1 to 4 elements, the power output of each block of elements being separately regulable. In the figures, the outlines of the blocks are denoted by thin lines, and heating elements 37 are denoted by means of thick lines, on a few of which a schematic winding is shown. The heating elements 37 may be of any elongated type suitable for mounting in the configuration shown, and able to provide the power density required. For example, the elements of peripheral regions 30 and 31 are longer and of lower power density than those of central region 33, which are shorter, and of higher power density. The elements of regions 32 and 34 are of intermediate length and of similar power density to those of regions 30 and 31. References to levels of power density take account of the spacing of elements as well as their individual size and power rating. It can be seen that preferably, elements of higher power density are used adjacent shields.

A commonly used type of element has a ceramic core with resistance wire wound around it. Where higher power is desired, elements with tubular quartz cores may be used, and where it is wished to pack elements closely together, the coiled wire may be inside a quartz tube.

As the power output of each block is independently regulated, more precise power control is possible where shorter elements are used, for example in the 15 blocks making up central region 33, because the independently regulated areas are smaller.

The direction of travel of glass sheets through the zone is shown by arrow G. When heating or bending glass sheets for the manufacture of windscreens or backlights, it is preferable to orient them with their axis of symmetry A—A parallel to arrow G, and the outline of sheets 20,21 is shown in their indexed position, i.e. when stationary. In these circumstances it has been found advantageous to align the elements of regions 30 and 31 parallel to this axis of symmetry, and the elements of regions 32, 33 and 34 at right angles to it. This assists in controlling the heat input to the portions adjacent the two long edges 22,23 of the sheet, and hence in controlling the temperature differentials between the centre 27 of the sheet and these long edges, so as to obtain the desired cross curvature profile in the glass sheet adjacent these edges.

Figure 4A:
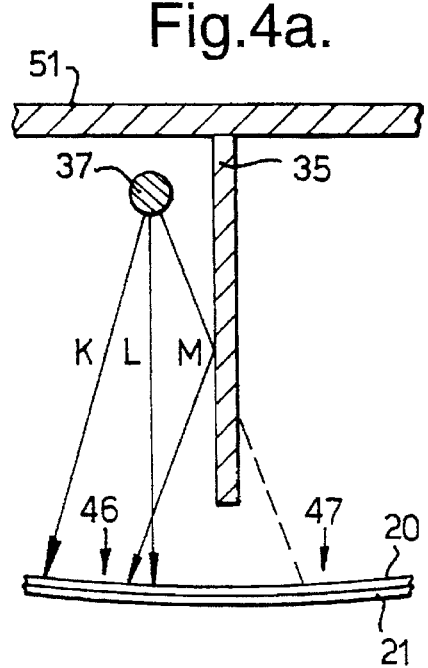
FIG. 4(a) and (b) are schematic cross-sections of a small part of a heated zone.

FIGS. 4(a) and (b) show schematically one main heating element 37 and one shield 35 for the purposes of explanation. Also shown are parts of sheets 20,21 including a first selected portion 46 to be heated to a higher temperature than a second selected portion 47. As shown in FIG. 4(a) radiant heat emitted by element 37 in directions K and L impinges directly on the first selected portion 46 of the upper glass sheet 20, and a substantial proportion is transmitted to the lower sheet 21. However, heat radiated in direction M impinges on the shield, and is predominantly reflected and/or scattered as shown. Heat radiated in direction M does not reach the second selected portion 47 as it otherwise would have done. The shield 35 therefore directs heat by a dual function of shading a selected portion 47 to be heated less, and reflecting/scattering heat towards a selected portion 46 to be heated more.

Figure 4B:
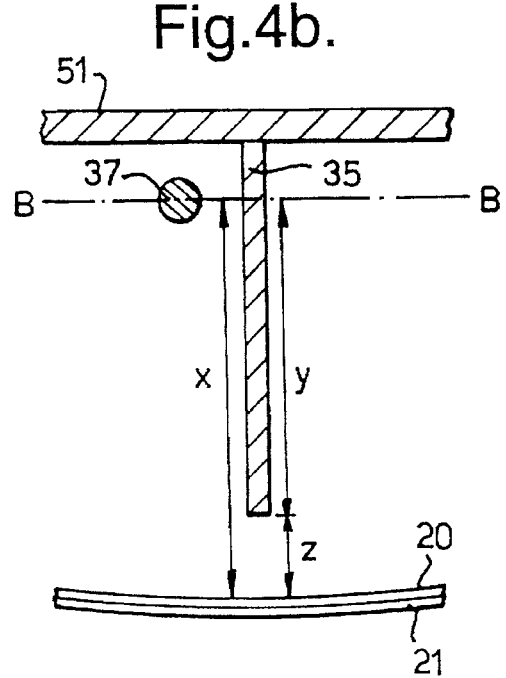

FIG. 4(b) illustrates various distances which will be referred to when describing preferred shield sizes and configurations. Line B—B represents the level of the main heating elements; distance 'x' is the distance from the level of the elements to the (upper) glass sheet in its bent condition; distance 'y' represents the portion of the shield which is positioned between the main heating elements and the glass sheet, i.e. the operative portion; and distance 'z' is the distance from the edge of the shield nearest the glass sheet, to the sheet. Clearly, x=y+z.

The number of shields 35 may be varied from one in total up to one per heating element 37, according to the nature of the temperature profile to be achieved. Similarly, the distribution of the shields within the zone may be symmetric or asymmetric. The orientation of a shield is determined, as a practical matter, by the orientation of the heating elements adjacent which the shield is to be placed. As explained above, the orientation of the heating elements may be varied according to which temperature profile one is seeking to control. In the example of a glass sheet for a windscreen, it is often the temperature profile from one long edge of the sheet, through the centre, to the other long edge, that is to be controlled, since this influences the cross curvature profile achieved.

Where a greater temperature differential between the centre and the edge of the glass sheet is desired, more shields will be required to direct heat radiated from the elements of the central region 33 (FIG. 3) towards the central part of the glass, and prevent heat reaching the cooler edges. In this situation, shields are placed in the central region 33 first therefore, and additional shields would normally only be placed in peripheral regions, e.g. 32 and 34, when region 33 is full. Each shield effectively reduces the area of the glass sheet heated by the elements adjacent the shield, i.e. reduces the effective angle of heat radiation from the adjacent elements.

Hence six shields 35 are used in section S3, where relatively high centre-edge differentials of 40°–55° C. are desired, and only two are used in bending section S4, because by this point the desired temperature differential has been largely established in the glass sheet.

Clearly the shields (regardless of the section in which they are used) must be made of a heat resistant material, sufficiently durable to give satisfactory service life, and preferably sufficiently rigid to maintain its shape (especially if mounted at an angle to the vertical), although shields suspended from the furnace roof may be made of heat resistant cloth. A suitable material is Fiberfrax Duraboard™ manufactured by Carborundum Resistant Materials Ltd of Rainford, St. Helens, Merseyside, UK. This is a rigid, high temperature board made from aluminosilicate fibres and organic bonding agents. Similar products are available from other refractory board manufacturers. The low density and ease of cutting assist in rapid and easy installation of the shields: however, for greater service life, a composite shield is preferable, consisting of a core of durable material such as fused silica, silicon carbide or silicon nitride, or a metal such as steel, faced with Fiberfrax# paper for low effective thermal mass. Alternatively, shields made of aluminosilicate boards such as Fiberfrax Duraboard# may be rendered more rigid and durable by the application of rigidising solutions such as "Rigidizer W", also available from Carborundum Resistant Materials Ltd.

It is also possible to control temperature differentials by varying the emissivity of the material used. A low emissivity material, such as Fiberfrax Duraboard™, reflects a greater proportion of incident thermal radiation than a higher emissivity material such as steel. Consequently, a shield with a Duraboard™ surface is more effective at directing heat, and thus causes a larger temperature differential for a given size and location of shield, than a shield with a steel surface.

Figure 5:
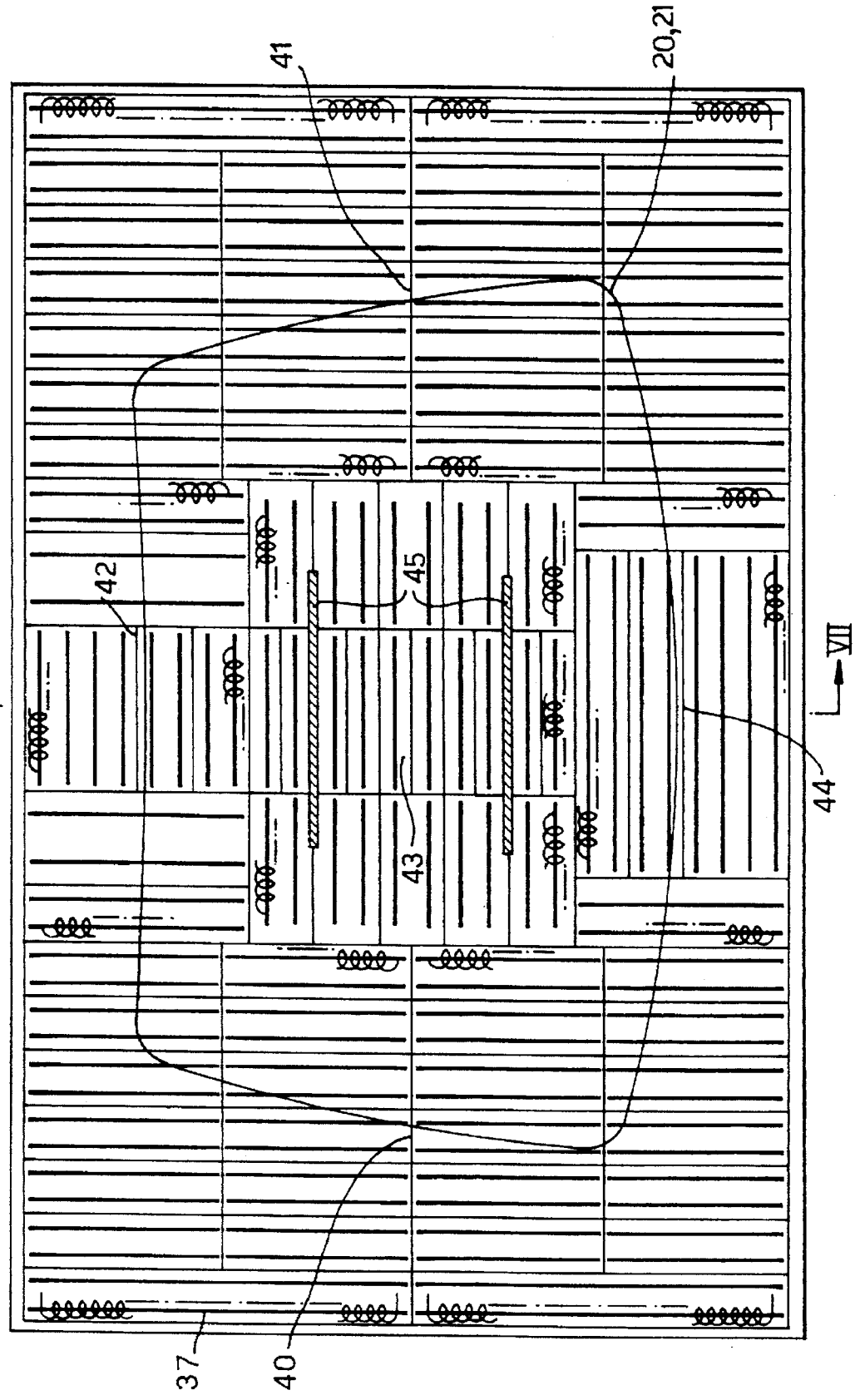
FIG. 5 is a plan view similar to FIG. 3 of another heating arrangement of another zone of FIG. 1.

A zone of the bending section S4 is shown is FIG. 5. The same considerations regarding size, type, power density and distribution of heating elements apply as described in conjunction with FIG. 3. The elements are similarly arranged in peripheral regions 40, 41, 42, 44 and central region 43. The beneficial effect of shields preventing heat radiating away from the central region 43 means that, especially in this zone, the power output of the elements need not be set so high in practice, which in turn has advantages especially for optical quality of the glass produced.

The comments above regarding number, position and type of shields are also applicable to section S4. As the centre-edge temperature differentials have already been largely established in the glass sheet, i.e. the centre of the sheet is already considerably hotter than the edges, differentials in S4 need not be as large as in section S3, being typically 30°–40° C. here, and two shields 45 are sufficient. These are placed close to the edge of central region 43 to prevent heat radiating onto the portions of the glass sheet below peripheral regions 42 and 44.

A cross-section on line VI—VI of FIG. 3 is shown in FIG. 6. This illustrates the partitions 50 between adjacent zones, part of the furnace structure comprising the furnace roof 51, and the elements of regions 32,33 and 34 together with shields 35. FIG. 6 also shows a preferred transport means in the form of a box 53, containing a ring mould 52 and provided with four wheels 54 (of which two are shown), which run on rails 55 extending the length of the furnace. A suitable conventional drive mechanism to propel the boxes along the rails is also provided (not shown). The ring mould 52 is a conventional gravity bending ring mould and is shown here in cross-section. The upper surface of the ring mould defines a position to be occupied by a pair of glass sheets, and in FIG. 7 the pair of sheets 20,21 is shown occupying such a position, supported by the mould. In FIG. 6 the sheets 20,21 are still flat and so they only make contact with the ring mould in areas adjacent short edges 24,25 of the sheets. These areas of course do not appear on FIG. 6 which shows a cross section on the centreline of the furnace; hence a gap is shown between the sheets and the mould in FIG. 6.

It is not essential that shields 35 pass between adjacent heating elements: the operative portion may be suspended below the elements. It is convenient, however, to extend the shield between the elements to the roof 51 for the purposes of supporting the shields without the need for other means of suspension. The length of shields 35 may be varied in any section according to the centre-edge differential desired. It is preferable to be able to adjust from outside the furnace the extent to which the shields extend beyond the elements, so that the temperature profile produced in a glass sheet may be controlled, thus controlling and allowing optimisation of the resulting bend profile, all without interrupting the passage of glass sheets through the system. In general, the further the shields extend beyond the elements, the more localised the heating achieved and the greater the centre-edge differential. Once optimised settings are established for the various products normally made, such an adjustment capability permits a rapid alteration of settings and hence a rapid changeover from one product to another.

The distance between the main elements and the fully bent glass sheet at the central shield locations of FIG. 6 is 330 mm. Of course, slightly different distances would be measured in other shield locations because of the varying curvature of the sheet. Also, the distance would be different if measured during the actual bending process before the glass sheet had adopted its final shape. The operative portion of the shield may extend for 30 mm (9% of 330 mm) for an initial heat directing effect. For greater effect, the operative portion may extend for 90 mm (27% of 330 mm), 150 mm (45% of 330 mm), 230 mm (70% of 330 mm), or any intermediate value. Still longer operative portions become feasible in practice when the shield is automated as described below.

As mentioned above, it is convenient to extend the shield upwards into the furnace roof for mounting purposes. However this is not essential, as the operative portion of the shield may be suspended by, for example, rods or wires. In this case, the top of the shield is preferably at the level of the elements, but again this is not essential, as a heat-directing effect is still obtained when there is a separation between the level of the elements and the level of the top of the shield. This separation may be 50 mm (15% of 330 mm), 100 mm (30% of 330 mm) or any intermediate value.

Figure 7:
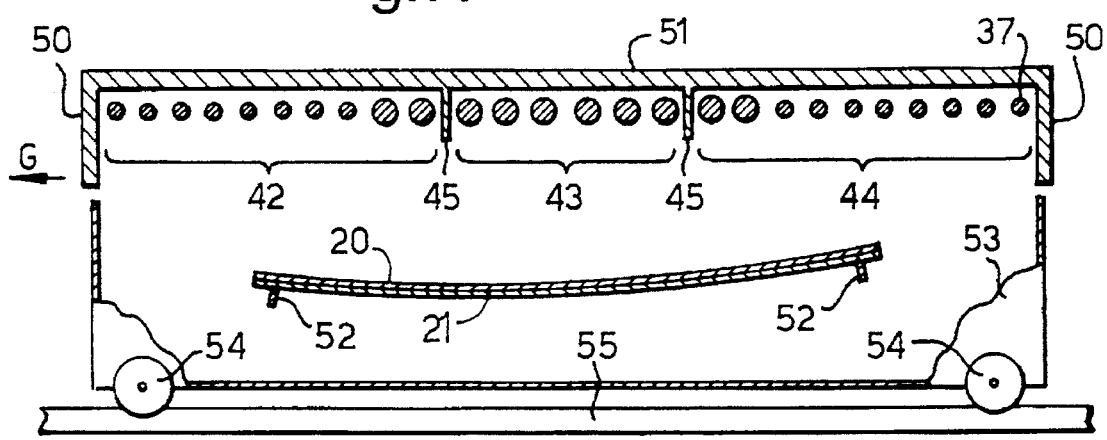
FIG. 7 is a similar cross-section taken in the direction of arrows VII—VII of FIG. 5

A cross-section on line VII—VII of FIG. 5 is shown in FIG. 7, and this differs from FIG. 6 principally in that two shields 45 are shown instead of six shields 35. The comments on FIG. 6 also apply to FIG. 7 mutatis mutandis. By the stage shown in this figure, the pair of glass sheets 20, 21 has sagged substantially into uniformity with the ring mould 52.

Figure 8:
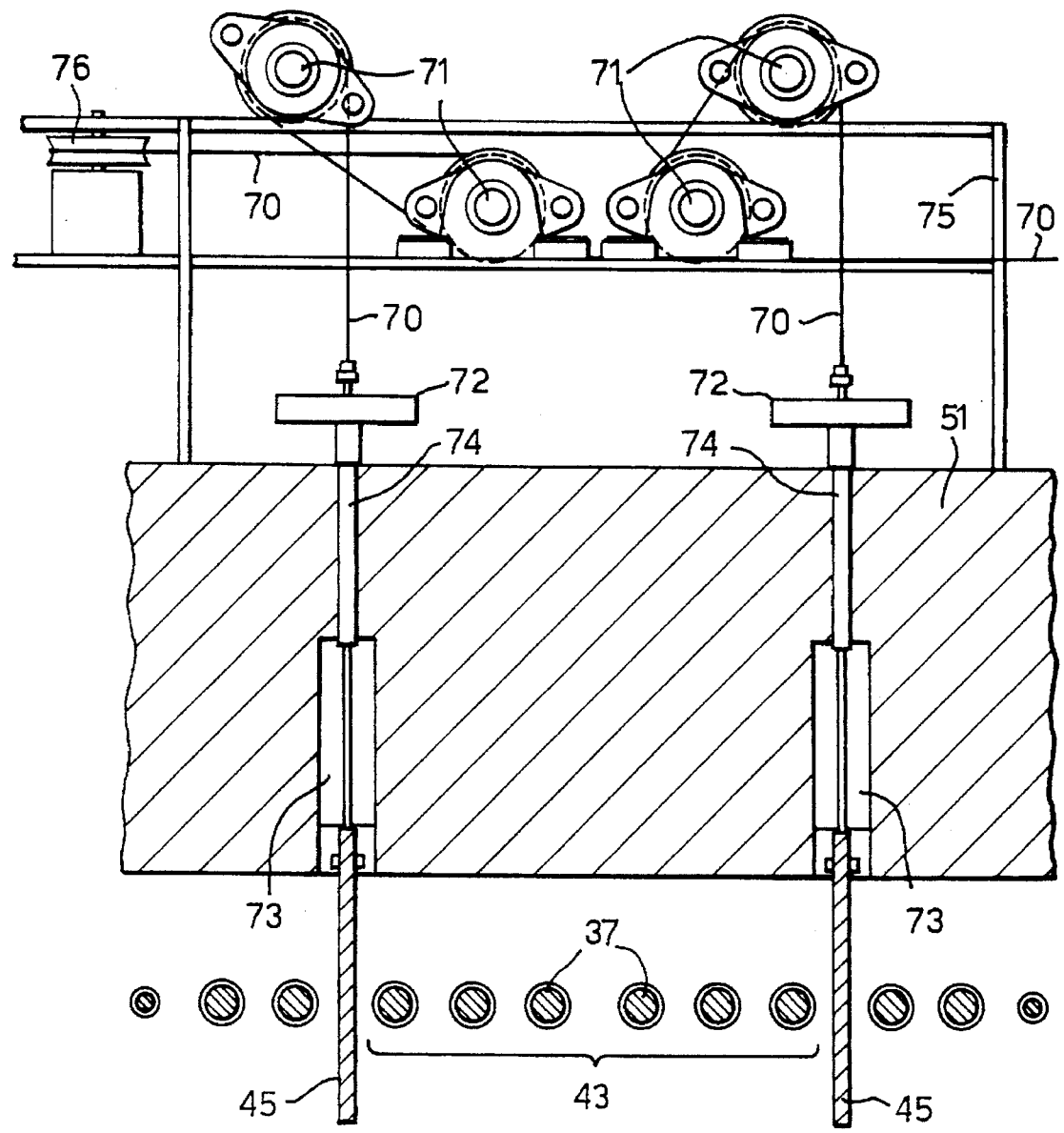
FIG. 8 is a view of a mechanism for adjusting the height of the shields as shown in FIG. 7.
Figure 9:
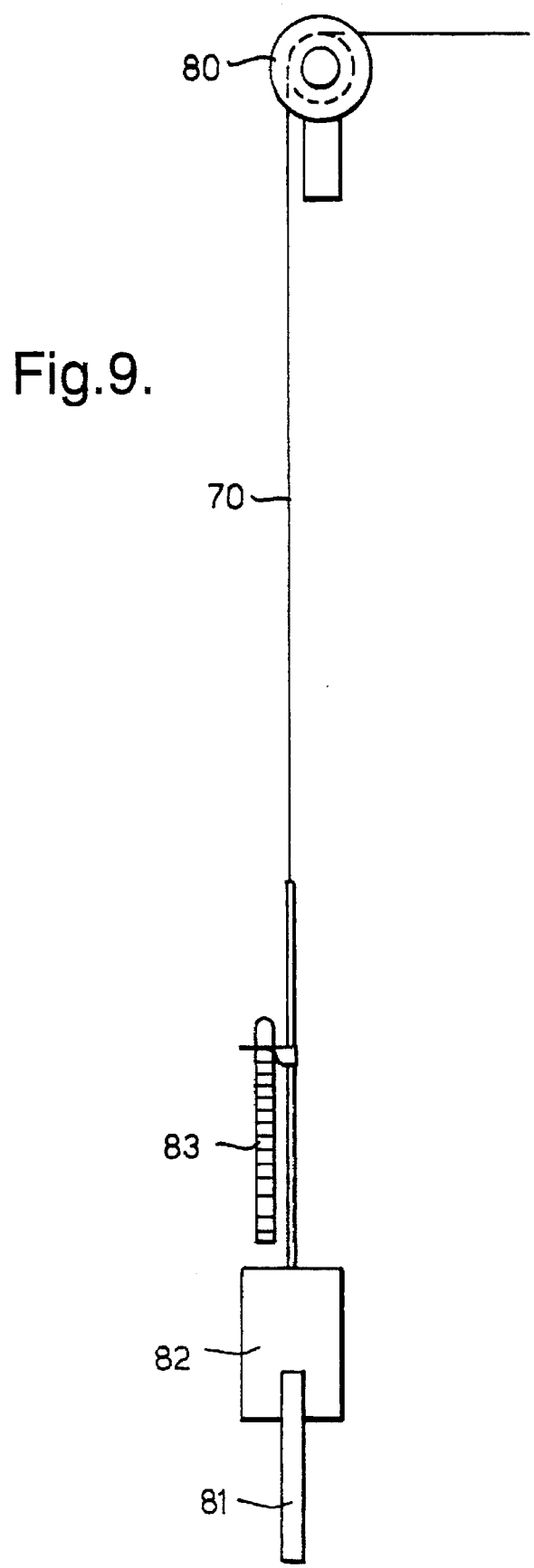
FIG. 9 shows a further part of this mechanism, not shown in FIG. 8.

A preferred way of providing the capability of adjusting the shields from outside the furnace referred to above is shown in FIGS. 8 and 9.

FIG. 8 shows the central part of FIG. 7, i.e. a cross-section through a zone in bending section S4, but in more detail, and with one possible adjusting mechanism added. Shields 45 are suspended on cables 70 which pass through the roof 51 via bores 74 and around pulleys 71, which are mounted on frame 75. Because the shields themselves may be very light, a weight 72 may also be suspended from each cable. After passing around pulleys 71, the cables 70 pass around further, horizontally orientated pulleys 76 (only one of which is shown), so that each cable turns through a right angle and passes out of the plane of the drawing to a further part of the mechanism shown in FIG. 9. Slots 73 are provided within roof 51 so that the shields 45 may be retracted if desired.

The remainder of the mechanism is shown in FIG. 9. This part of the mechanism would normally be at the side of the relevant section, i.e. the plane of FIG. 9 is at right angles to FIG. 8. Cable 70 passes over pulley 80 and to a winding mechanism 81.

A counterbalance weight 82 is provided, as is a scale and pointer 83 from which the position of the shield relative to the elements within the heating zone may be ascertained. A corresponding mechanism is provided for each adjustable shield.

Alternatively the adjustment of any shield may be automated by use of servo motors. Apart from convenience and saving of labour, this has the further advantage of making the use of shields very close to the glass sheet a practical possibility. Permanent positioning of a shield so close to the glass sheet that it is below the periphery of the ring mould would result in the shield obstructing the mould when the mould is moved from one zone to the next. A microprocessor controlled motorised adjustment mechanism could be programmed to lift the shields for each mould movement, and replace them for the next glass sheet. In this way, shields that extend as much as 85% of the distance from the elements to the fully bent glass sheet may be used, i.e. to within 50 mm of the glass sheet, and 280 mm from the elements.

Figure 10:
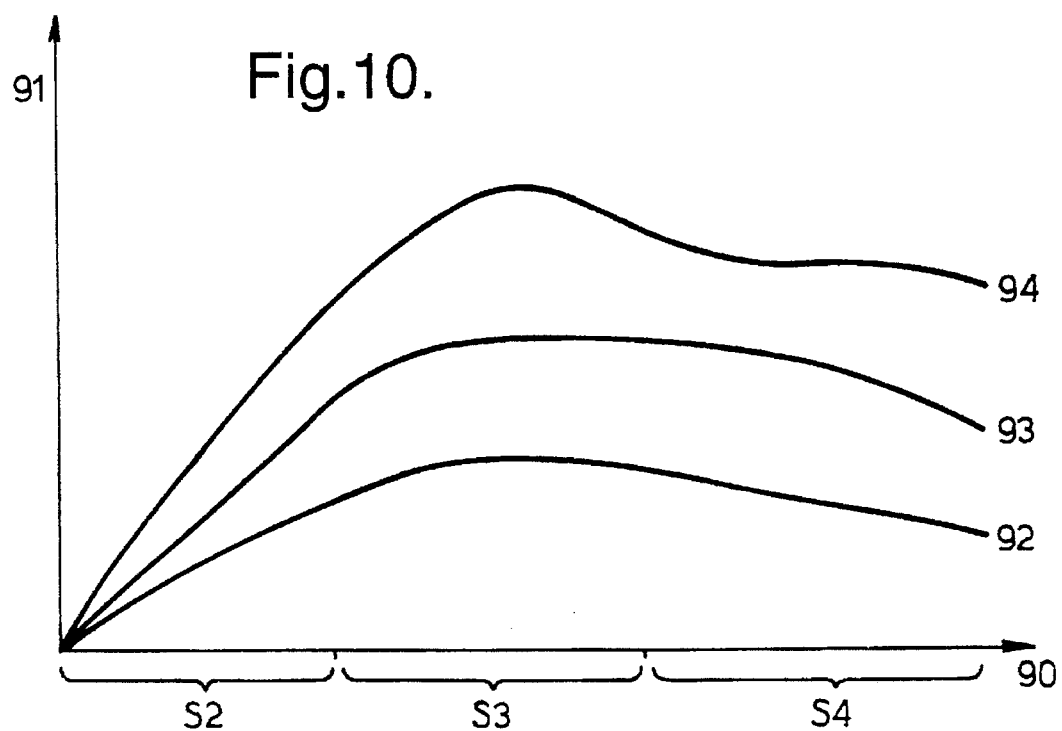
FIG. 10 is a schematic graph comparing temperature differentials measured in prior art tunnel furnaces, and a furnace in accordance with the invention.

The effect of adjusting the extension of the operative portion of the shields is shown in FIG. 10, in which x-axis 90 represents the heating zones of sections S2, S3 and S4, and y-axis 91 represents temperature differentials obtained between the centre and a long edge of a glass sheet. Line 92 shows results obtained on a prior art furnace without shields (in fact, the furnace as described above, but with shields removed), whereas line 93 shows results obtained on a furnace as described above where the operative portion extended 90 mm beyond the heating elements, with a separation of 240 mm between the shields and the glass sheet. Line 94 again shows results obtained on a furnace in accordance with the invention, where the extension of the operative portion was increased to 150 mm, with a separation of 180 mm between the shields and the glass sheet. Centre-edge differentials of up to 55° C. were obtained with six shields in section S3, and up to 40° C. with two shields in section S4. Given that the differentials of 20°–25° represented by line 92 are typical of those achievable with the most recent state of the art technology, the differentials obtained with the invention are surprisingly high, and useful improvements in centre-edge differential have been obtained with operative portions as small as 30 mm. The invention therefore represents a considerable advance over the prior art, and has enabled, for example, glass sheets for windscreens of complex shape with a cross curvature of up to 25 mm to be bent with a satisfactory cross curvature profile, thereby greatly alleviating the poor wiper performance and optical distortion resulting from flat or inverse curvature. Of course, different shield distributions and operative portion extensions may be needed for each different glass shape to be produced, and some initial experimentation is preferable to optimise the settings for each shape.

Figure 11:
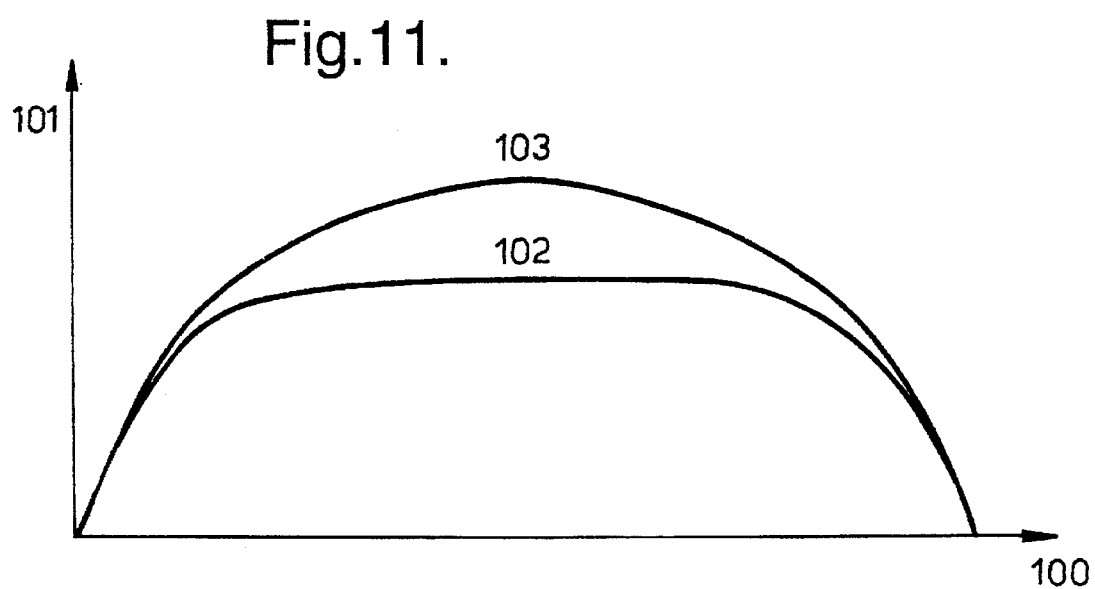
FIG. 11 is a schematic graph comparing cross curvature profiles of glass sheets bent according to the prior art and according to a preferred embodiment of the invention.

An example of the improvement in shape obtained by use of the invention is given in FIG. 11, in which the x-axis 100 represents the distance along a sample glass sheet measured from the long edge, that would be the bottom edge if the sheet were part of an installed windscreen, towards the opposed long edge. Y-axis 101 represents the level of cross curvature obtained, and curve 102 shows the cross curvature profile obtained on a glass sheet bent according to the prior art. The flat central region of the glass sheet is evident. By appropriate use of shields as described above in the differential heating sections S3 and S4 of the furnace, a glass sheet was bent on which cross curvature profile 103 was measured. The flat central region has been eliminated, and the profile obtained is close to the target of a uniformly cylindrical cross curvature profile.

Although the invention has been usefully applied in improving cylindrical cross-curvature profile in glass sheets, it is by no means limited thereto, and may also be used in, for example, producing S-shaped cross-curvature. In this situation, the cross-curvature profile of a windscreen reverses towards its lower edge, i.e. towards the vehicle bonnet; in other words there is a point of inflection. Creating such a cross-curvature profile requires careful control of the temperature profile in the glass sheet on both sides of the point of inflection during bending: this is a situation where a carefully chosen asymmetric distribution of shields is appropriate.

Another situation in which the invention may usefully be applied occurs when a windscreen is to match the roofline of the vehicle, i.e. the topmost part of the windscreen is substantially parallel to the roofline at the point of contact. This requires variation of the radius of cross-curvature in the upper part of the windscreen, which in turn requires a particular temperature profile during heating and bending. Again, an asymmetric distribution of shields is appropriate.

The invention may also be used to impart extra heat to the short edges of a windscreen glass, for example because a deeper bend is desired adjacent the A pillars. FIG. 12 shows a zone from differential pre-heating section S3 to which eight further shields 115 have been added, arranged to prevent undesired ingress of the extra heat from heaters adjacent the short edges towards the centre of the windscreen. The shield locations shown in FIG. 12 are general, i.e. not tailored to a particular windscreen shape, for the heating pattern is not especially critical at this stage.

By way of comparison, FIG. 13 shows a zone from bending (with differential heating) section S4 to which eight further shields 125 have been added in an arrangement that is tailored to a particular windscreen shape. At this later stage, where bending is actively occurring, one may wish to provide substantially more heat to the short edges, and a tailored arrangement allows more precise control of this extra heat, restricting it to the edge portion of the glass sheet.

The arrangement of FIG. 13 is also useful when an undesirable inverse curvature occurs towards the corners of a glass sheet because the glass sheet has not sagged right to the corners during bending. This may be alleviated by raising the temperature of this part of the glass sheet at a late stage in the bending process. By use of accurately located shields, the additional heat required may be more precisely directed than would be the case if the power output of the heating elements above that part of the glass sheet were simply increased. This is also a situation where adjustable shields are particularly advantageous, as the operative portion extension may be increased at the appropriate time in the bending process.

The present invention alleviates many of the problems found in the prior art. Only the particular heating zones of the furnaces in which shields are actually required need be so equipped. The expense of equipping every mould or other support for glass sheets with devices such as prior art shields or heat sinks is therefore avoided. Furthermore since the shields of the present invention are only associated with the particular heating zones of the furnace where they are needed, they do not cause the loading or annealing problems outlined above by being present elsewhere.

Greater control of the temperature profile across the whole glass sheet is possible, and greater centre-edge differentials are achieved than has hitherto been routinely possible.

What is claimed is:

1. An apparatus for heating a glass sheet to its bending temperature and bending it to a predetermined shape, comprising:

a furnace including at least one differential heating zone a plurality of electric main heating elements disposed within said differential heating zone, said electric main heating elements constructed and arranged so as to provide the principle source of heat in said differential heating zone, transport means for advancing the glass sheet through the furnace, said transport means including and defining a position to be occupied by the glass sheet, at least one shield for directing radiant heat, the shield establishing a temperature differential across the glass sheet to control a cross curvature profile of the glass sheet, the shield being disposed in a central region of the electric main heating elements within the differential heating zone on the same side of said position to be occupied by the glass sheet as the electric main heating elements, said shield being supported by furnace structure forming a part of the furnace, a heating element positioned closest to said shield, said heating element positioned closest to said shield being one of the main heating elements, means for bending the heated sheet to a predetermined shape, said transport means co-operating with the bending means so that the sheet is bent when heated to its bending temperature.

2. An apparatus according to claim 1, wherein the density of heating power available from the main heating elements is greater adjacent the shield than it is elsewhere in the differential heating zone.

3. An apparatus according to claim 1, wherein the furnace includes a roof and said shield is supported from the roof of the furnace.

4. An apparatus according to claim 1, wherein the shield is oriented substantially vertically and extends beyond the main heating elements away from the adjacent furnace structure.

5. An apparatus according to claim 4, adapted to bend a glass sheet having an axis of mirror symmetry wherein a plane generally defined by the shield is at right angles to the axis of mirror symmetry of the glass sheet.

6. An apparatus according to claim 1, wherein at least some of the main heating elements are arranged relative to the position to be occupied by the glass sheet so that part of the heat radiated by the main heating elements impinges directly on the glass sheet.

7. An apparatus according to claim 1, comprising adjustment means for adjusting the position of the shield from outside the furnace.

8. An apparatus according to claim 1, wherein at least one heating element immediately adjacent a shield extends parallel to the shield, and at least one other heating element in the same zone as the at least one heating element extends at right angles to the at least one heating element.

9. An apparatus according to claim 1, wherein a pair of glass sheets is supported on a gravity bending ring mould while both glass sheets are advanced through the furnace.

10. An apparatus according to claim 9, wherein the shield within the differential heating zone extends substantially perpendicular to a direction of advancement of the mould through said differential heating zone.

11. An apparatus according to claim 1, comprising successive heating, heating with bending, and annealing sections, wherein at least one of the heating and heating with bending sections comprises the at least one differential heating zone and the transport means advances one or more glass sheets through said successive sections.

12. A method of heating a glass sheet to its bending temperature in a furnace, and bending the sheet to a predetermined shape, the sheet including a first selected portion to be heated to a higher temperature than a second selected portion, the method comprising:

advancing the sheet through the furnace, said furnace including a plurality of electric radiant main heating elements constructed and arranged so at to provide the principle source of heat for heating the sheet, the furnace further including at least one shield for directing radiant heat, the shield being disposed in a central region of the electric radiant main heating elements and on the same side of the glass sheet as the main heating elements, one of the main heating elements being a heating element that is positioned closest to the shield, heating the glass sheet to its bending temperature in the furnace, while establishing a desired temperature differential between said first and second selected portions of the glass sheet to control a cross curvature profile of the glass sheet, by directing radiant heat from said first selected portion to said second selected portion by way of the shield, bending the heated glass sheet to a predetermined shape, and cooling the bent glass sheet.

13. A method according to claim 12, wherein the temperature differential established between the selected portions of the sheet results in a desired cross curvature on bending the sheet.

14. A method according to claim 12, including bending the sheet by a gravity bending process.

15. A method according to claim 12, including subjecting the sheet to a press bending step.

16. A method according to claim 14, including subjecting the sheet to a press bending step.

17. A method according to claim 12, including annealing the sheet while cooling it.

18. A method according to claim 12, wherein the furnace includes at least one differential heating zone, the method including indexing the glass sheet with the differential heating zone while the glass sheet is advanced.

* * * * *